US012327954B2

(12) United States Patent
Karita et al.

(10) Patent No.: US 12,327,954 B2
(45) Date of Patent: Jun. 10, 2025

(54) CONNECTOR AND CABLE WITH CONNECTOR

(71) Applicant: SUMITOMO WIRING SYSTEMS, LTD., Mie (JP)

(72) Inventors: Masahiro Karita, Mie (JP); Yasuo Imai, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 208 days.

(21) Appl. No.: 17/912,781

(22) PCT Filed: Mar. 9, 2021

(86) PCT No.: PCT/JP2021/009106
§ 371 (c)(1),
(2) Date: Sep. 19, 2022

(87) PCT Pub. No.: WO2021/192979
PCT Pub. Date: Sep. 30, 2021

(65) Prior Publication Data
US 2023/0318233 A1 Oct. 5, 2023

(30) Foreign Application Priority Data
Mar. 24, 2020 (JP) ................................ 2020-052677

(51) Int. Cl.
*H01R 13/6592* (2011.01)

(52) U.S. Cl.
CPC ................................ *H01R 13/6592* (2013.01)

(58) Field of Classification Search
CPC ................................................. H01R 13/6592
USPC .................................................... 439/607.41
See application file for complete search history.

(56) References Cited

U.S. PATENT DOCUMENTS

2007/0059970 A1* 3/2007 Ichio .................. H01R 13/6272 439/382
2013/0288523 A1* 10/2013 Ii ........................ H01R 13/6581 439/607.01
2014/0051295 A1* 2/2014 Westman ............ H01R 13/518 439/626

(Continued)

FOREIGN PATENT DOCUMENTS

DE 102017008995 A1 * 4/2018 ............ H01R 11/11
JP 2020013803 A * 1/2020 ............ H01R 13/00

(Continued)

OTHER PUBLICATIONS

International Search Report issued on May 11, 2021 for WO 2021/192979 A1 (4 pages).

*Primary Examiner* — Peter G Leigh
(74) *Attorney, Agent, or Firm* — Venjuris, P.C.

(57) ABSTRACT

The connector includes an inner conductor with electrical conductivity including a wire barrel that connects to the core wire and the terminal connection portion that electrically connects to the tab portion T of a mating terminal, a dielectric that is made of a synthetic resin and that includes a cavity that houses the inner conductor, and an outer conductor with electrical conductivity that encloses the dielectric, wherein the dielectric includes a first wall portion (inter-layer partition wall) adjacent to the inner conductor, and a portion of the first wall portion is a thin portion with less thickness than other portions.

10 Claims, 12 Drawing Sheets

(56) References Cited

U.S. PATENT DOCUMENTS

| | | | | |
|---|---|---|---|---|
| 2014/0060882 | A1* | 3/2014 | Ellis | H01R 43/28 174/113 R |
| 2018/0102597 | A1* | 4/2018 | Maesoba | H01R 13/6583 |
| 2018/0261933 | A1* | 9/2018 | Maesoba | H01R 13/422 |
| 2018/0261945 | A1* | 9/2018 | Maesoba | H01R 13/422 |
| 2019/0319406 | A1* | 10/2019 | Maesoba | H01R 24/22 |
| 2020/0005966 | A1* | 1/2020 | Blackburn | H01B 11/002 |
| 2020/0136294 | A1* | 4/2020 | Maesoba | H01R 13/506 |

FOREIGN PATENT DOCUMENTS

| | | | | |
|---|---|---|---|---|
| JP | 2020017544 | A * | 1/2020 | H01R 13/02 |
| WO | WO-2019124035 | A1 * | 6/2019 | H01R 13/111 |

* cited by examiner

CONNECTOR AND CABLE WITH CONNECTOR

CROSS REFERENCE TO RELATED APPLICATIONS

This application is a national phase of PCT application No. PCT/JP2021/009106, filed on 9 Mar. 2021, which claims priority from Japanese patent application No. 2020-052677, filed on 24 Mar. 2020, all of which are incorporated herein by reference.

TECHNICAL FIELD

The technology disclosed in the present specification relates to a connector and a cable with a connector.

BACKGROUND

A known cable with a connector is provided with a shielded electrical wire and a connector configured to connect to a terminal portion of the shielded electrical wire. The shielded electrical wire is provided with a core wire, a shielded wire including an insulating cover that covers the outer circumference of the core wire, a shield foil that covers the outer circumference of the shielded wire, and a sheath that covers the outer circumference of the shield foil. The connector is provided with a male terminal (inner conductor) configured to connect to the core wire, an inner housing with insulating properties that covers the male terminal, and a shield shell that covers the inner housing.

PRIOR ART DOCUMENT

Patent Document

Patent Document 1: JP 2013-229255 A

SUMMARY OF THE INVENTION

Problems to be Solved

In the connector with the configuration described above, the amount of metal is greater in the inner conductor than in the core wire of the shielded wire. Thus, there is a large change in characteristic impedance between the core wire and the inner conductor. At the point where the characteristic impedance changes, the signal may be reflected, causing a decrease in the communication quality.

Means to Solve the Problem

A connector disclosed in the present specification is a connector that connects to a terminal portion of a cable provided with a coated wire including a core wire and an insulating cover that covers an outer circumference of the core wire, and a shield member that encloses an outer circumference of the coated wire, the connector including an inner conductor with electrical conductivity including an electrical wire connection portion that connects to the core wire and a terminal connection portion that electrically connects to a mating terminal; a dielectric that is made of a synthetic resin and that includes a cavity that houses the inner conductor; and an outer conductor with electrical conductivity that encloses the dielectric, wherein the dielectric includes a first wall portion adjacent to the inner conductor, and a portion of the first wall portion is a thin portion with less thickness than other portions.

A cable with a connector disclosed in the present specification is a cable with a connector including a cable including a coated wire including a core wire and an insulating cover that covers an outer circumference of the core wire, and a shield member that encloses an outer circumference of the coated wire; and a connector that connects to a terminal portion of the cable, wherein the connector includes an inner conductor with electrical conductivity including an electrical wire connection portion that connects to the core wire and a terminal connection portion that electrically connects to a mating terminal, a dielectric that is made of a synthetic resin and that includes a cavity that houses the inner conductor, and an outer conductor with electrical conductivity that encloses the dielectric; the dielectric includes a first wall portion adjacent to the inner conductor; and a portion of the first wall portion is a thin portion with less thickness than other portions.

Effect of the Invention

According to a connector and a connector with a cable disclosed in the present specification, a decrease in communication quality caused by a large change in characteristic impedance can be suppressed.

DETAILED DESCRIPTION TO EXECUTE THE INVENTION

Summary of Embodiments

Figure 1:
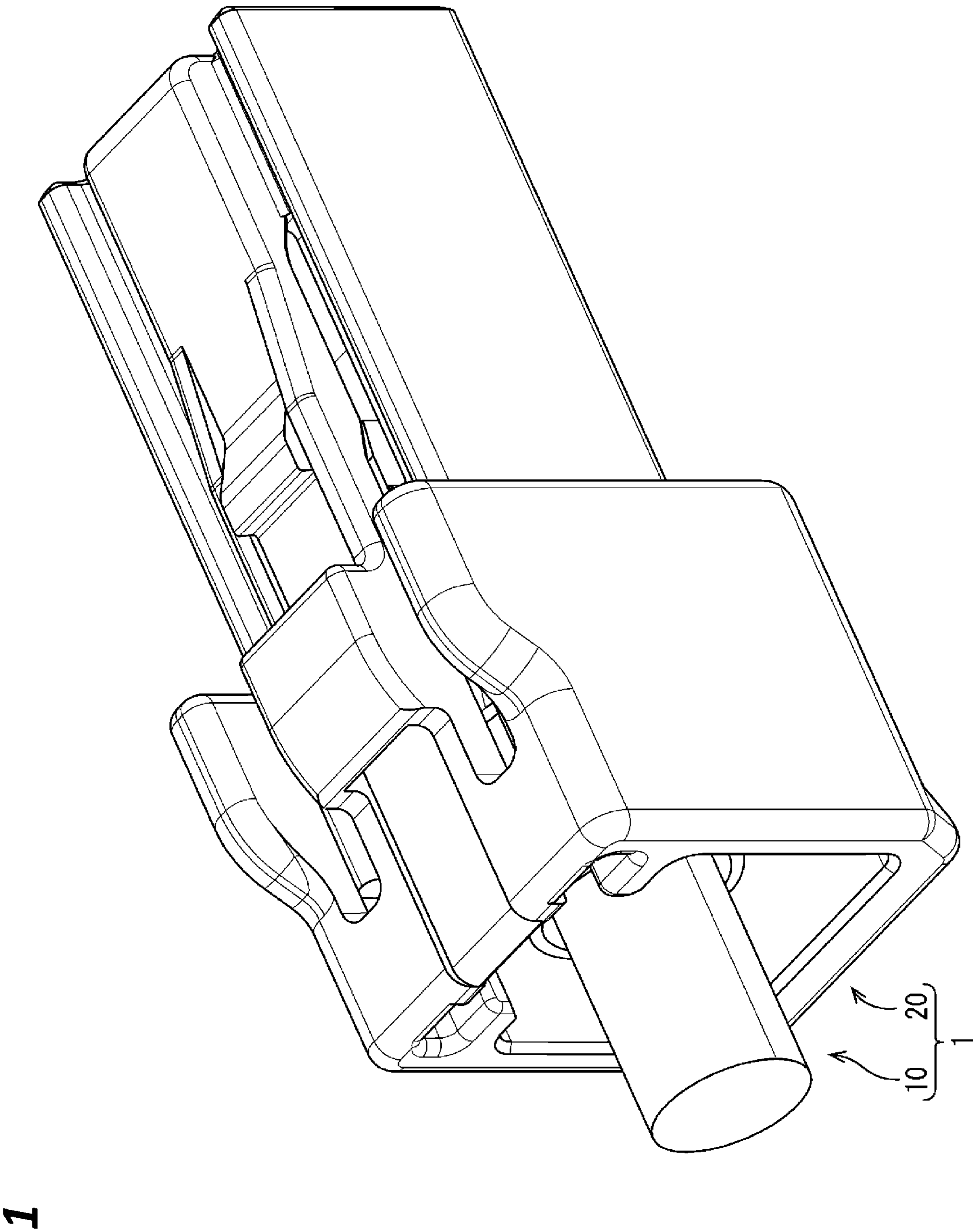
FIG. 1 is a perspective view of a cable with a connector of an embodiment.

1. A connector disclosed in the present specification is a connector that connects to a terminal portion of a cable provided with a coated wire including a core wire and an insulating cover that covers an outer circumference of the core wire, and a shield member that encloses an outer circumference of the coated wire, the connector including an inner conductor with electrical conductivity including an electrical wire connection portion that connects to the core wire and a terminal connection portion that electrically connects to a mating terminal; a dielectric that is made of a synthetic resin and that includes a cavity that houses the inner conductor; and an outer conductor with electrical conductivity that encloses the dielectric, wherein the dielectric includes a first wall portion adjacent to the inner conductor, and a portion of the first wall portion is a thin portion with less thickness than other portions.

A cable with a connector disclosed in the present specification is a cable with a connector including a cable including a core wire, a coated wire including an insulating cover that covers an outer circumference of the core wire, and a shield member that encloses an outer circumference of the coated wire; and a connector that connects to a terminal portion of the cable, wherein the connector includes an inner conductor with electrical conductivity including an electrical wire connection portion that connects to the core wire and a terminal connection portion that electrically connects to a mating terminal, a dielectric with synthetic resin properties including a cavity that houses the inner conductor, and an outer conductor with electrical conductivity that encloses the dielectric; the dielectric includes a first wall portion adjacent to the inner conductor; and a portion of the first wall portion is a thin portion with less thickness than other portions.

According to this configuration, compared to a configuration in which the first wall portion does not include a thin portion, the amount of the synthetic resin forming the first wall portion is less than in other portions, this amount allowing a gap to exist around the inner conductor. Because air has a lower dielectric constant than the synthetic resin, by reducing the amount of synthetic resin around the inner conductor and forming a gap, a decrease in the characteristic impedance can be suppressed. Also, the gap formed by providing a thin portion can be used as space for inserting a detachment tool for detaching the inner conductor from the dielectric.

2. The terminal connection portion may include a connection barrel portion including an opening end with an opening portion, the connection barrel portion internally receiving the mating terminal, and the thin portion may be disposed adjacent to a portion of the connection barrel portion other than the opening end.

According to this configuration, the thin portion is disposed adjacent to the connection barrel portion with a greater amount of metal than the other portions of the inner conductor. This allows a reduction in characteristic impedance to be effectively suppressed. Also, by the thin portion being disposed away from the opening end where, in the connection barrel portion, a decrease in insulation withstand voltage tends to occur, the insulation withstand voltage can be ensured.

3. The dielectric may include a second wall portion adjacent to the inner conductor, and the second wall portion may include a through hole.

According to this configuration, compared to a configuration in which the second wall portion does not include a through hole, the amount of the synthetic resin forming the second wall portion is less than in other portions, this amount allowing space to exist around the inner conductor. Because air has a lower dielectric constant than the synthetic resin, by reducing the amount of synthetic resin around the inner conductor and forming space, a decrease in the characteristic impedance can be suppressed.

Note that the second wall portion may be a wall portion identical to the first wall portion or may be a different wall portion.

4. The terminal connection portion may include a connection barrel portion including an opening end with an opening portion, the connection barrel portion internally receiving the mating terminal, and the through hole may be disposed adjacent to a portion of the connection barrel portion other than the opening end.

According to this configuration, the through hole is disposed adjacent to the connection barrel portion with a greater amount of metal than the other portions of the inner conductor. This allows a reduction in characteristic impedance to be effectively suppressed. Also, by the through hole being disposed away from the opening end where, in the connection barrel portion, a decrease in insulation withstand voltage tends to occur, the insulation withstand voltage can be ensured.

5. The terminal connection portion may include a contact point portion that comes into contact with the mating terminal, and the through hole may be disposed adjacent to a portion of the terminal connection portion where the contact point portion is disposed.

The portion of the terminal connection portion where the contact point portion is disposed tends to have a particularly large amount of metal compared to other portions. By the through hole being disposed adjacent to this portion, a reduction in characteristic impedance can be effectively suppressed.

6. The dielectric may include a holding projection that holds the inner conductor inside the cavity by projecting inside the cavity and fixing the inner conductor in place, and the holding projection and the through hole may be disposed aligned in a direction orthogonal to the second wall portion.

According to this configuration, the through hole can be advantageously used as a hole for forming the holding projection when forming the dielectric.

7. The dielectric may include a dielectric body including the first wall portion and a cover that attaches to the dielectric body and covers the first wall portion. Alternatively, the dielectric may include a dielectric body including the second wall portion and a cover that attaches to the dielectric body and covers the second wall portion.

According to this configuration, a foreign object entering inside the space formed due to the thin portion or the through hole can be prevented.

DESCRIPTION OF EMBODIMENTS

A specific example of the technology disclosed in the present specification will be describe below with reference to the drawings. Note that the present invention is not limited to these examples and is defined by the scope of the claims, and all modifications that are equivalent to or within the scope of the claims are included.

EMBODIMENTS

An embodiment will be described with reference to FIGS. 1 to 12. The present embodiment is an example of a cable 1 with a connector for use in communications installed in a vehicle such as an automobile and disposed on a wired communication path between an in-vehicle electrical component (car navigation system, ETC, monitor, or the like)

inside the vehicle and an external device (a camera or the like) or between in-vehicle electrical components.

Figure 2:
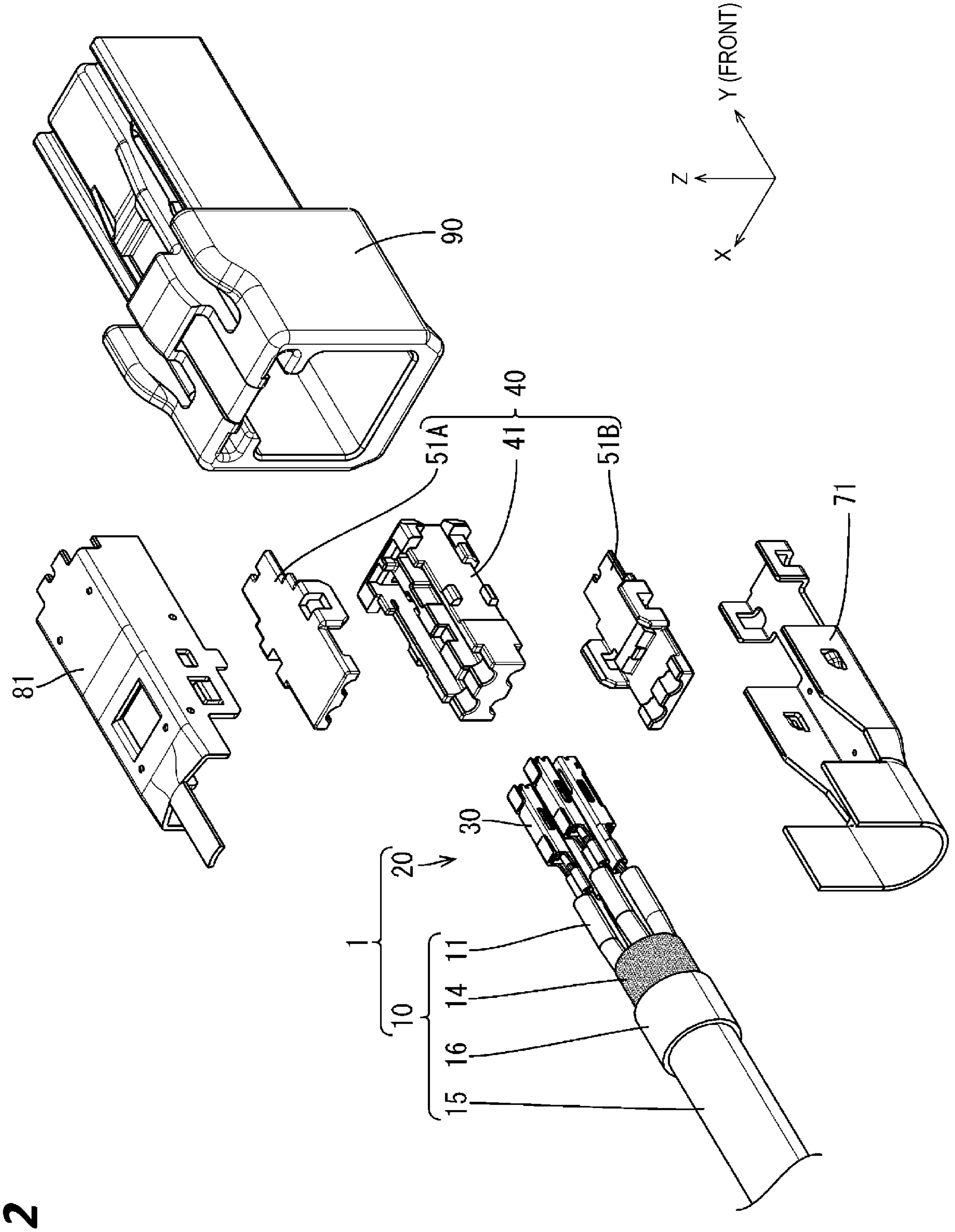
FIG. 2 is an exploded perspective view of the cable with a connector of this embodiment.

As illustrated in FIGS. 1 and 2, the cable 1 with a connector is provided with a cable 10 including a coated wire 11 and a connector 20 configured to connect with a terminal portion of the cable 10. Hereinafter, the extension direction (Y-axis direction in FIG. 2) of the coated wire 11 is defined as the front-and-back direction, one direction (X-axis direction in FIG. 2) of the two directions perpendicular to the extension direction of the coated wire 11 is defined as the left-and-right direction, and the other direction (Z-axis direction in FIG. 2) is defined as the up-and-down direction. For members including a plurality of members, a reference sign or number may only be given to one or more of the members of the plurality and not given to other members.

Cable 10

Figure 3:
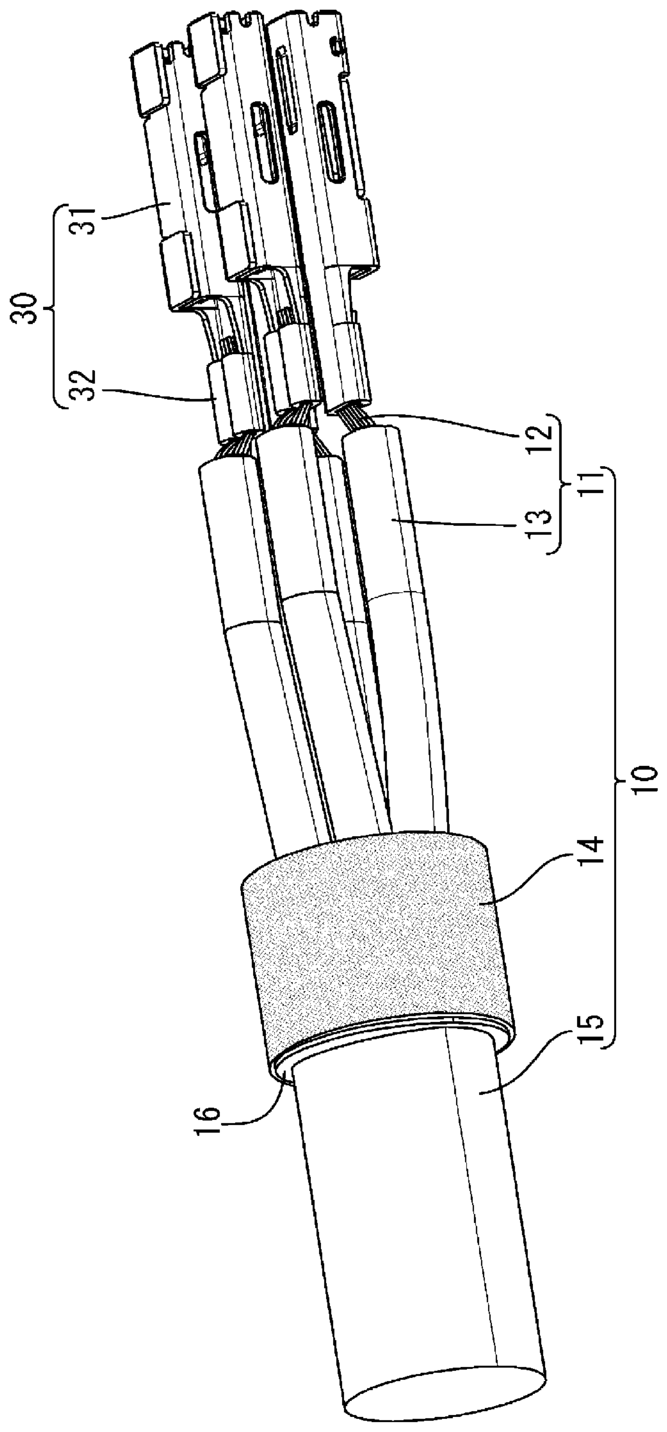
FIG. 3 is a perspective view illustrating a state in which an inner conductor is attached to the cable of this embodiment.

As illustrated in FIGS. 2 and 3, the cable 10 is provided with a plurality (four in the present embodiment) of the coated wires 11, a braided wire 14 (an example of a shield member) that collectively covers the plurality of coated wires 11, and a sheath 15 that covers the outer circumference of the braided wire 14. Each coated wire 11 is provided with a core wire 12 with electrical conductivity and an insulating cover 13 that encloses the outer circumference of the core wire 12. The core wire 12 may be made from one metal wire or made from a stranded wire including a plurality of metal wires twisted together. The insulating cover 13 and the sheath 15 are made of a synthetic resin with insulating properties. The braided wire 14 is a cylindrical member made of a braided mesh of fine metal wires (metal wires). The plurality of coated wires 11 are twisted together and covered in this state by the braided wire 14 and the sheath 15.

At the terminal portion of the cable 10, the sheath 15 is stripped, with the terminal portion of the braided wire 14 being exposed from the sheath 15. The terminal portion of the braided wire 14 exposed from the sheath 15 is folded back to the sheath 15 side where it overlaps with the sheath 15 on the outer side. A metal sleeve 16 is disposed on the outer side of the terminal of the sheath 15 and on the inner side of the braided wire 14 overlapping the terminal of the sheath 15. The sleeve 16 is compression-bonded to wrap tightly around the outer circumference of the sheath 15. In FIG. 2, the sheath 15 is illustrated in a stripped state, and the terminal portion of the braided wire 14 is illustrated in a state of being exposed from the sheath 15. In the state illustrated in FIG. 3, the braided wire 14 is folded back and overlapped with the outer side of the sheath 15 and the sleeve 16. Also, the terminal portions of the coated wires 11 are exposed from the sheath 15 and the braided wire 14 in an untwisted state. At the terminal portions of the coated wires 11, the insulating cover 13 is stripped and the core wire 12 is exposed from the insulating cover 13.

Connector 20

The connector 20 is provided with an inner conductor 30 with electrical conductivity configured to connect to the coated wires 11, a dielectric 40 with insulating properties that encloses the inner conductor 30, an outer conductor 70 with electrical conductivity that encloses the dielectric 40, and a housing 90 that houses all of these.

Inner Conductor 30

Figure 4:
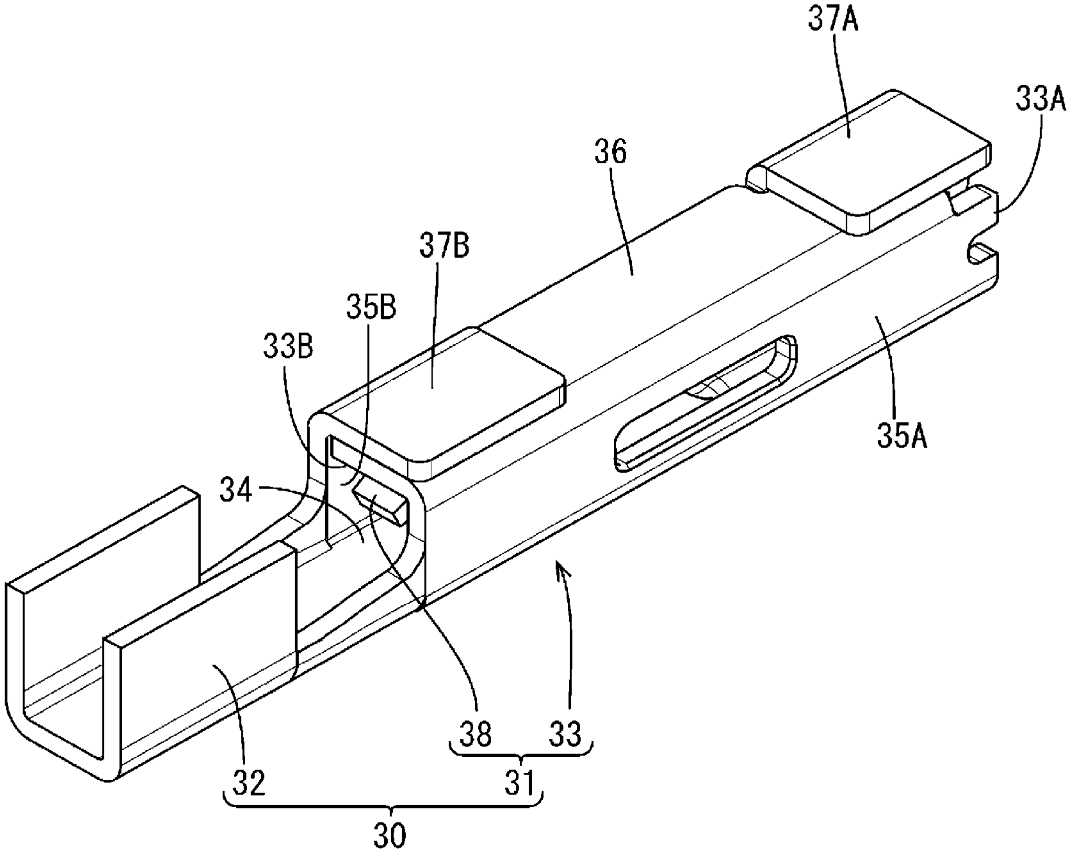
FIG. 4 is a perspective view of the inner conductor of this embodiment.

The inner conductor 30 is a female terminal formed by pressing a metal plate material. As illustrated in FIGS. 3 and 4, the inner conductor 30 is provided with a terminal connection portion 31 configured to be electrically connected to a male terminal, i.e., the mating terminal, and a wire barrel 32 (an example of an electrical wire connection portion) that is contiguous with the terminal connection portion 31 and is configured to connect to the coated wires 11.

Figure 9:
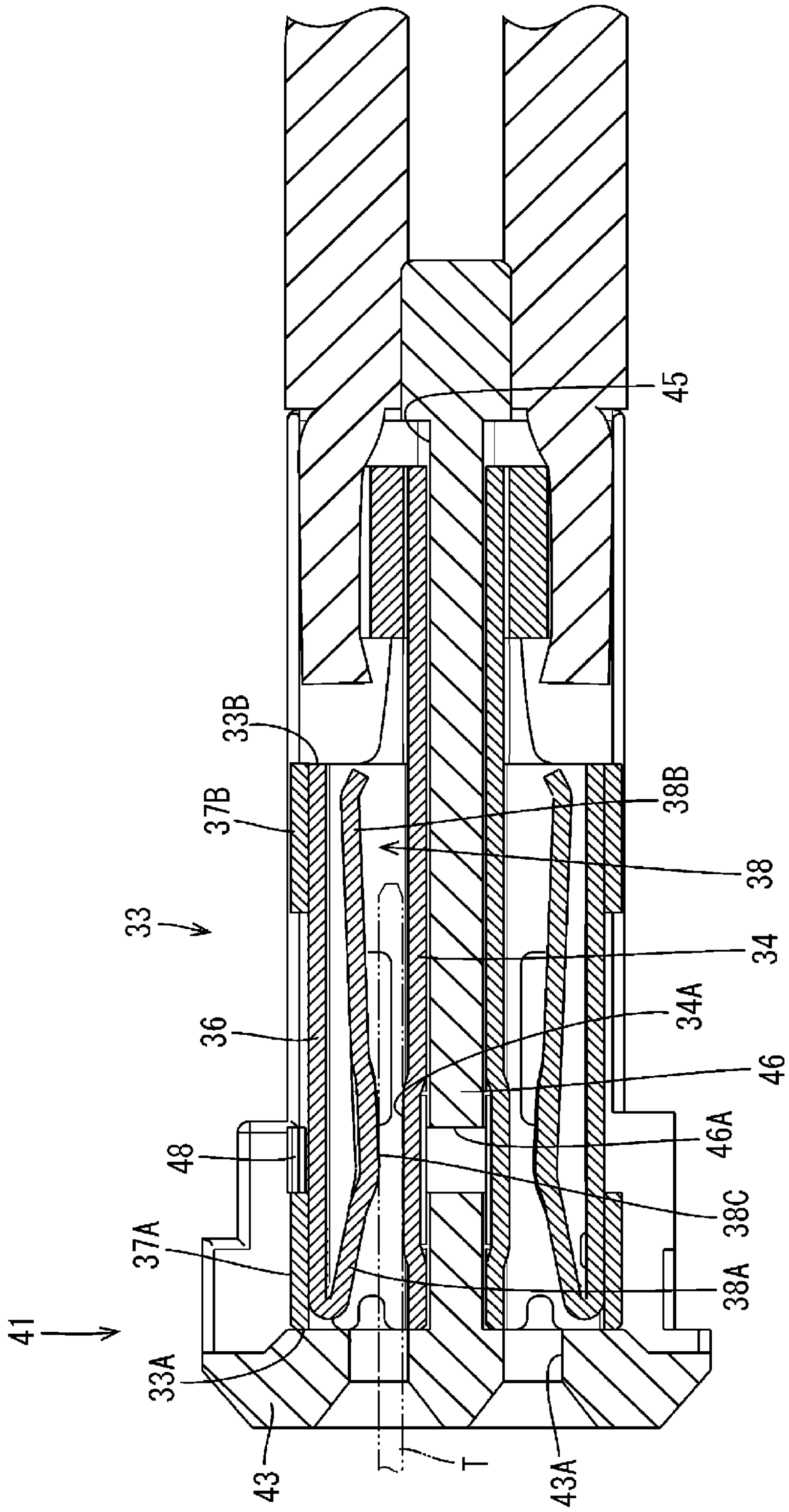
FIG. 9 is a cross-sectional view taken along line B-B of FIG. 7.

As illustrated in FIG. 9, the terminal connection portion 31 is provided with a barrel-like connection barrel portion 33 that houses a tab portion T provided on the male terminal and a flexible contact piece 38 disposed inside the connection barrel portion 33 that comes into contact with the tab portion T.

Figure 8:
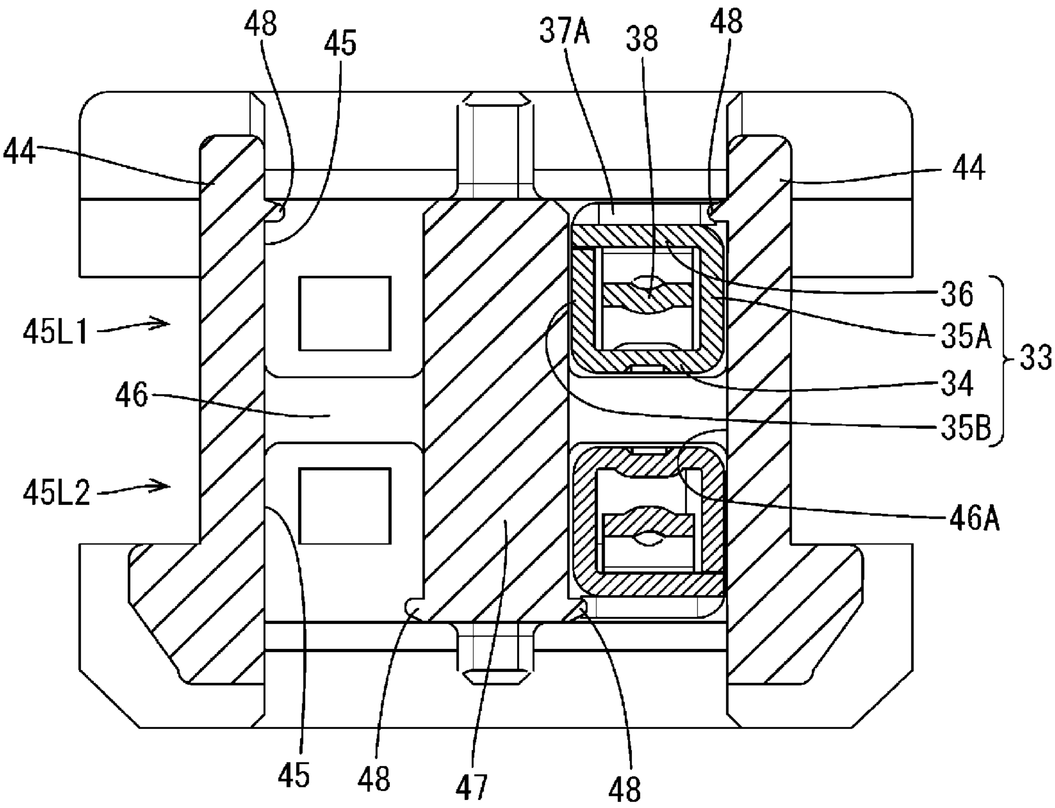
FIG. 8 is a cross-sectional view taken along line A-A of FIG. 7.

As illustrated in FIGS. 4, 8, and 9, the connection barrel portion 33 has a rectangular prism-like shape with openings on both ends. One of two opening ends 33A and 33B is a first opening end 33A where the tab portion T is inserted, and the other one is a second opening end 33B. The connection barrel portion 33 is constituted by a bottom wall 34, a pair of first side walls 35A and 35B, and a top wall 36. The bottom wall 34 has an elongated plate-like shape and includes a pair of side edges. The pair of first side walls 35A and 35B each have an elongated plate-like shape and are erected on the two side edges of the bottom wall 34 rising up in a direction perpendicular to the bottom wall 34. The two first side walls 35A and 35B are disposed facing one another. The top wall 36 has an elongated plate-like shape, extends contiguously from one first side wall 35A toward the other first side wall 35B, and is disposed facing the bottom wall 34. Two overlapping pieces 37A and 37B extending contiguously from the other first side wall 35B toward the one first side wall 35A are disposed on the outer surface of the top wall 36 overlapping the outer surface. One of the two overlapping pieces 37A and 37B is a first overlapping piece 37A disposed adjacent to the first opening end 33A, and the other one is a second overlapping piece 37B disposed adjacent to the second opening end 33B.

The flexible contact piece 38 has a plate spring-like shape and is disposed along the top wall 36 as illustrated in FIG. 9. The flexible contact piece 38 includes, at one end portion, a base end portion 38A configured to connect to the first opening end 33A and, at the other end portion, a free end portion 38B. The flexible contact piece 38 has a mountain-like shape, with a portion on the base end portion 38A side gently separating from the top wall 36 as it extends away from the first opening end 33A and a remaining portion near the free end portion 38B gently approaching the top wall 36 as it extends away from the first opening end 33A. The apex portion of the mountain-like shape has a dome-like shape that bulges toward the bottom wall 34, the apex portion corresponding to a contact point portion 38C that comes into contact with the tab portion T.

The portion of the bottom wall 34 that faces the contact point portion 38C bulges toward the contact point portion 38C, as illustrated in FIG. 9. The bulging portion corresponds to a pressure receiving portion 34A for ensuring contact pressure with the tab portion T when the tab portion T is sandwiched between the pressure receiving portion 34A and the contact point portion 38C.

As illustrated in FIG. 4, the wire barrel 32 extends from the second opening end 33B, is compression-bonded with the core wire 12 exposed from the insulating cover 13 of the coated wire 11 as illustrated in FIG. 3, and is electrically connected to the core wire 12.

Dielectric 40

Figure 5:
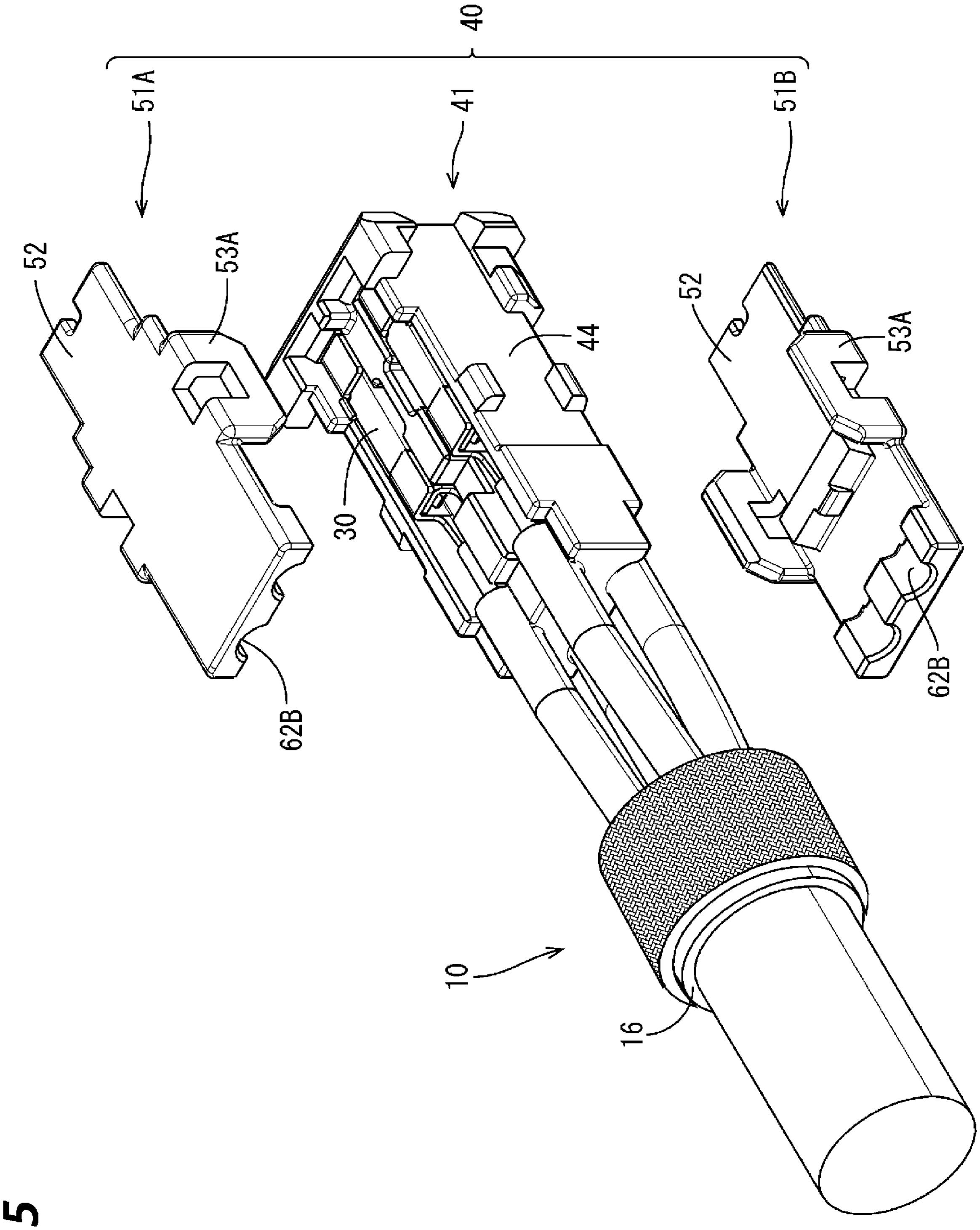
FIG. 5 is a perspective view illustrating a state in which a dielectric is partway through being attached to the inner conductor and a terminal portion of the cable of this embodiment.

As illustrated in FIG. 5, the dielectric 40 is made of a synthetic resin and is provided with a dielectric body 41 and an upper cover 51A (an example of a cover) and a lower cover 51B (an example of a cover) that attached to the dielectric body 41.

Figure 6:
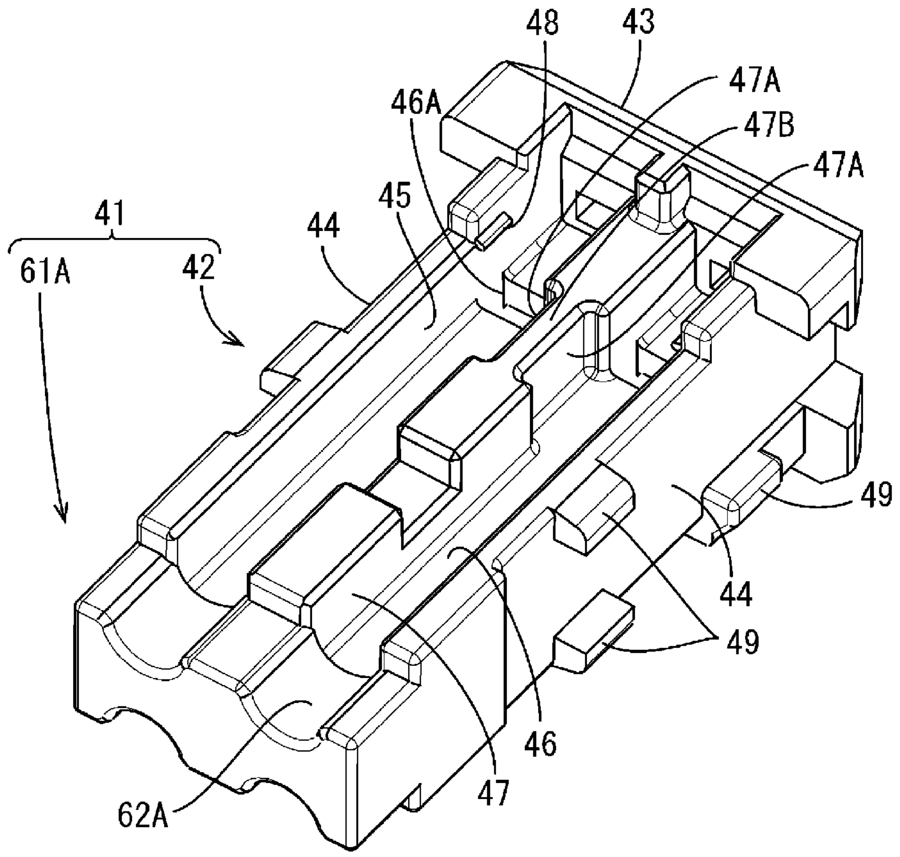
FIG. 6 is a perspective view of a dielectric body of this embodiment.

As illustrated in FIG. 6, the dielectric body 41 has an overall rectangular parallelepiped shape elongated in the front-and-back direction. The dielectric body 41 is provided with an inner conductor holding portion 42 and a first electrical wire holding portion 61A. The inner conductor holding portion 42 is provided with a front wall 43 and a left and right pair of second side walls 44 extending perpendicular from the front wall 43.

As illustrated in FIGS. 6, 7, 8, and 9, the inner conductor holding portion 42 includes a plurality (four in the present embodiment) of cavities 45 that house the plurality of inner conductor 30 between the two second side walls 44. The four cavities 45 are arranged in an upper and a lower level with two cavities 45 in each. The two cavities 45 of the upper cavity row (a first cavity row 45L1) extend in a direction perpendicular to the front wall 43 and have a groove-like shape opening upward. The two cavities 45 of the lower cavity row (a second cavity row 45L2) extend in a direction perpendicular to the front wall 43 and have a groove-like shape opening downward. Note that to make the diagrams easier to understand, in FIGS. 7 and 8, one or more of the inner conductors 30 housed in the cavities 45 are not illustrated.

As illustrated in FIGS. 6, 7, 8, and 9, the inner conductor holding portion 42 is provided with an inter-row partition wall 46 (an example of a second wall portion) and an inter-layer partition wall 47 (an example of a first wall portion). The inter-row partition wall 46 is disposed perpendicular to the second side walls 44 and is connected to the two second side walls 44. The inter-row partition wall 46 partitions the cavity 45 of the first cavity row 45L1 and the cavity 45 of the second cavity row 45L2. The inter-layer partition wall 47 extends perpendicular from the inter-row partition wall 46 and partitions the two adjacent cavities 45 of the first cavity row 45L1 and partitions the two adjacent cavities 45 of the second cavity row 45L2.

As illustrated in FIGS. 6, 7, 8, and 9, the inter-row partition wall 46 includes a through hole 46A that communicates with the cavity 45 of the first cavity row 45L1 and the cavity 45 of the second cavity row 45L2.

Figure 7:
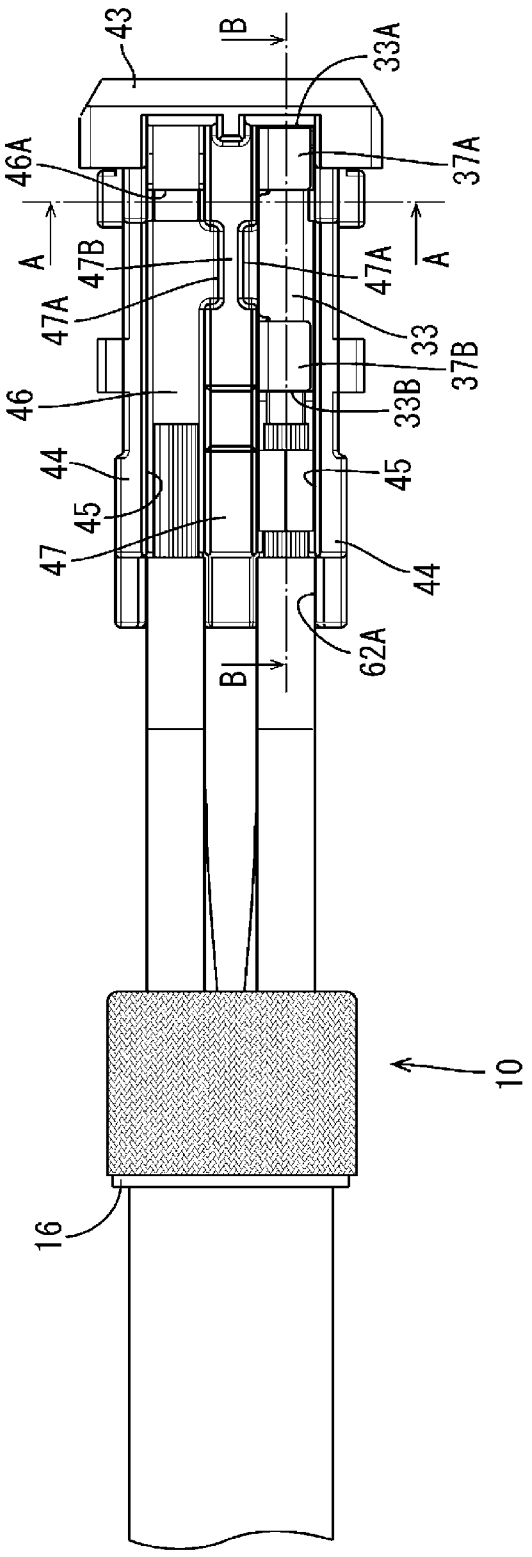
FIG. 7 is a plan view illustrating a state in which the dielectric body is attached to the inner conductor and the terminal portion of the cable of this embodiment.

As illustrated in FIGS. 6 and 7, the inter-layer partition wall 47 includes a recess portion 47A that is recessed from the surface that faces the inner conductor 30 housed inside the cavity 45. One inter-layer partition wall 47 includes two recess portions 47A disposed back-to-back. One recess portion 47A of the two recess portions 47A is disposed in the surface that faces one of the two inner conductors 30 housed in the two cavities 45 disposed on either side of the inter-layer partition wall 47, and the other recess portion 47A is disposed on the surface facing the other one of the two inner conductors 30. In the inter-layer partition wall 47, the portion between the two recess portions 47A corresponds to a thin portion 47B with less thickness than the other portions.

As illustrated in FIGS. 6, 8, and 9, the inner conductor holding portion 42 is provided with a holding projection 48. One holding projection 48 is provided for each cavity 45. Each holding projection 48 projects toward the inner side of the cavity 45 and holds the inner conductor 30 inside the cavity 45 by fixing the inner conductor 30 in place.

As illustrated in FIG. 8, the holding projection 48 projecting inside one cavity 45 of the first cavity row 45L1, the holding projection 48 projecting inside another cavity 45 of the second cavity row 45L2 adjacent to the one cavity 45 of the first cavity row 45L1, and the through hole 46A disposed between these two cavities 45 are disposed in a row in the up-and-down direction, i.e., a direction perpendicular to the inter-row partition wall 46. Also, the holding projection 48 disposed in the one cavity 45 projects from the second side wall 44, and the holding projection 48 disposed inside the other cavity 45 projects from the inter-layer partition wall 47. In other words, the holding projection 48 disposed inside the one cavity 45 and the holding projection 48 disposed inside the other cavity 45 project from walls on different sides relative to the inner conductors 30. According to this configuration, the through hole 46A can be advantageously used as a hole for forming the holding projection 48 when forming the inner conductor 30.

As illustrated in FIG. 9, the front wall 43 includes a tab insertion hole 43A communicating with each one of the cavities 45. The tab insertion hole 43A is where the tab portion T can be inserted. Also, as illustrated in FIG. 6, the inner conductor holding portion 42 is provided with a plurality of lock projections 49 projecting outward from the second side walls 44 on the left and the right.

As illustrated in FIG. 6, the first electrical wire holding portion 61A has a block-like shape and is contiguous with the back end of the inner conductor holding portion 42. The first electrical wire holding portion 61A includes a first electrical wire holding groove 62A communicating with each one of the four cavities 45. Each first electrical wire holding groove 62A is a groove defined by the half-pipe shaped inner wall surface corresponding to the shape of the outer circumferential surface of the insulating cover 13 of the coated wire 11.

Figure 10:
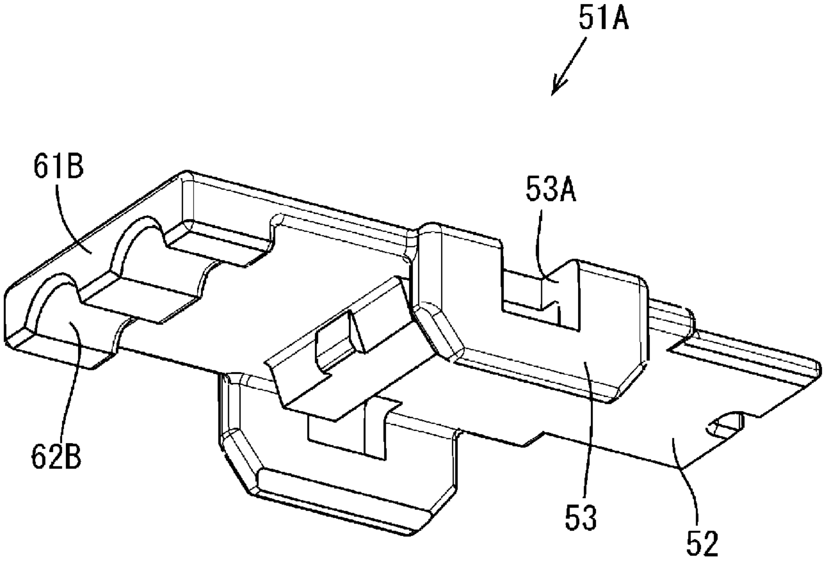
FIG. 10 is a perspective view of an upper cover of this embodiment.

As illustrated in FIG. 10, the upper cover 51A is provided with a cover body 52 with a plate-like shape, a lock piece 53 with a plate piece-like shape extending from both side edges of the cover body 52, and a second electrical wire holding portion 61B contiguous with the back end of the cover body 52. The second electrical wire holding portion 61B includes two second electrical wire holding grooves 62B. Each second electrical wire holding groove 62B is a groove defined by the half-pipe shaped inner wall surface corresponding to the shape of the outer circumferential surface of the insulating cover 13 of the coated wire 11. The lock pieces 53 each includes a lock hole 53A for receiving the lock projections 49 provided on the dielectric body 41. As illustrated in FIGS. 5 and 10, the upper cover 51A is attached to the dielectric body 41 from above. The cover body 52 is disposed parallel with the inter-row partition wall 46 and covers the inner conductors 30 housed in the cavities 45 of the first cavity row 45L1 from above.

The lower cover 51B is attached to the dielectric body 41 from below and covers the inner conductors 30 housed in the cavities 45 of the second cavity row 45L2 from below. The lower cover 51B has a similar configuration as the upper cover 51A, and thus components are given the same reference sign and descriptions thereof are omitted.

Outer Conductor 70

Figure 11:
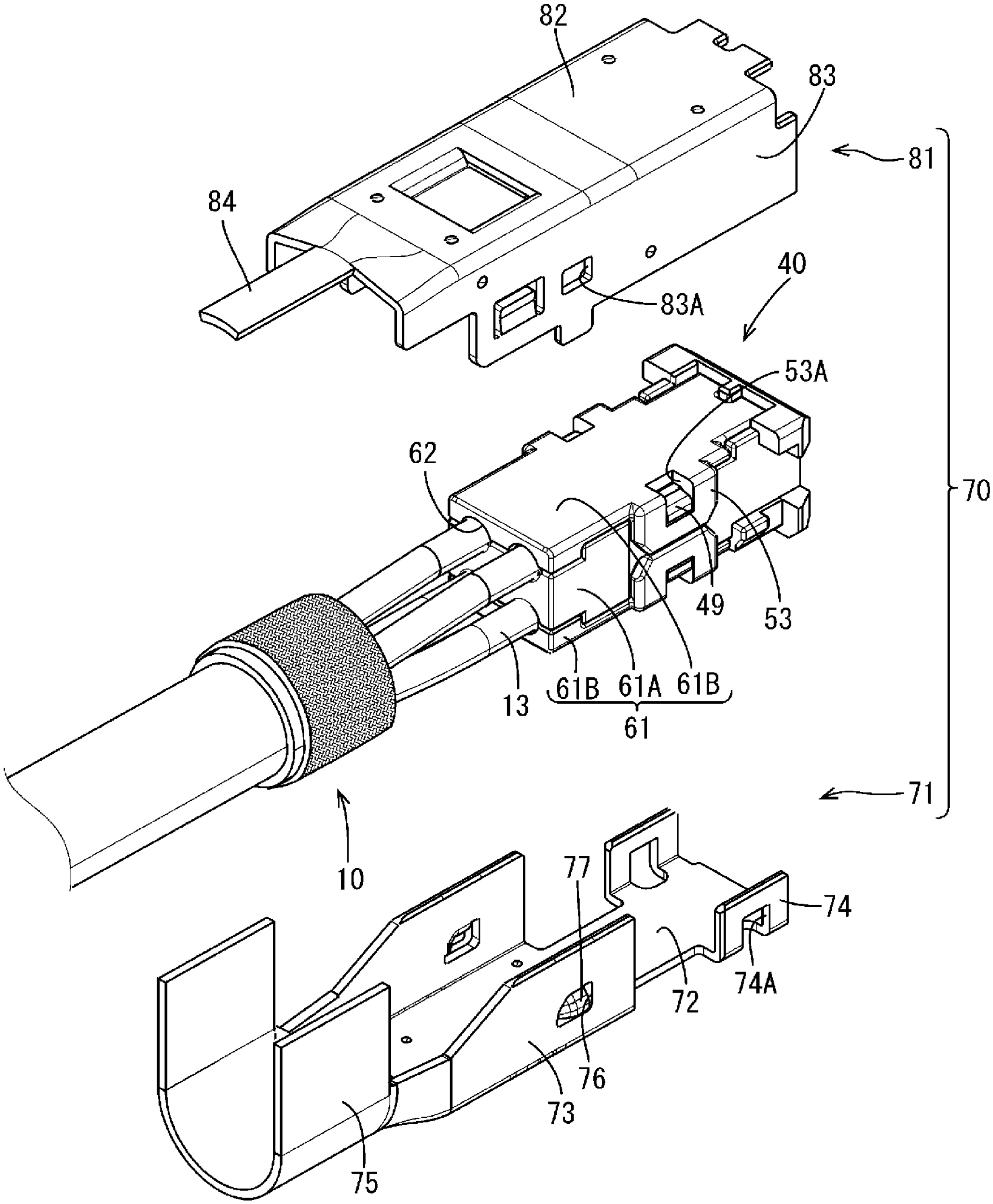
FIG. 11 is a perspective view illustrating a state prior to an outer conductor being attached to the dielectric of this embodiment.

As illustrated in FIG. 11, the outer conductor 70 is made of metal and is provided with a first outer conductor 71 attached to the dielectric 40 from below and a second outer conductor 81 attached to the dielectric 40 from above.

The first outer conductor 71 is provided with a lower wall 72 disposed along the cover body 52 of the lower cover 51B, a pair of third side walls 73 and a pair of lock pieces 74 extending from both side edges of the lower wall 72 and facing one another, and a band-like fixing barrel 75 contiguous with the back end of the lower wall 72 that is wrapped around the portion of the terminal of the sheath 15 where the braided wire 14 is folded back. The pair of third side walls 73 each include an L-shaped slit 76, with the portion defined by the slit 76 corresponding to a bulging portion 77 bulging outward. The lock pieces 74 each includes a lock hole 74A for receiving the lock projections 49 provided on the dielectric body 41.

The second outer conductor 81 is provided with an upper wall 82 disposed along the cover body 52 of the upper cover 51A, a pair of fourth side walls 83 extending from both side edges of the upper wall 82 and disposed on the outer side of the third side walls 73 and the lock pieces 74, and a tongue piece 84 extending from the upper wall 82. The fourth side walls 83 are each provided with a receiving hole 83A for receiving the bulging portions 77 provided on the third side walls 73. The tongue piece 84 has an elongated plate-like shape and extends backward from the back end of the upper wall 82.

Housing 90

Figure 12:
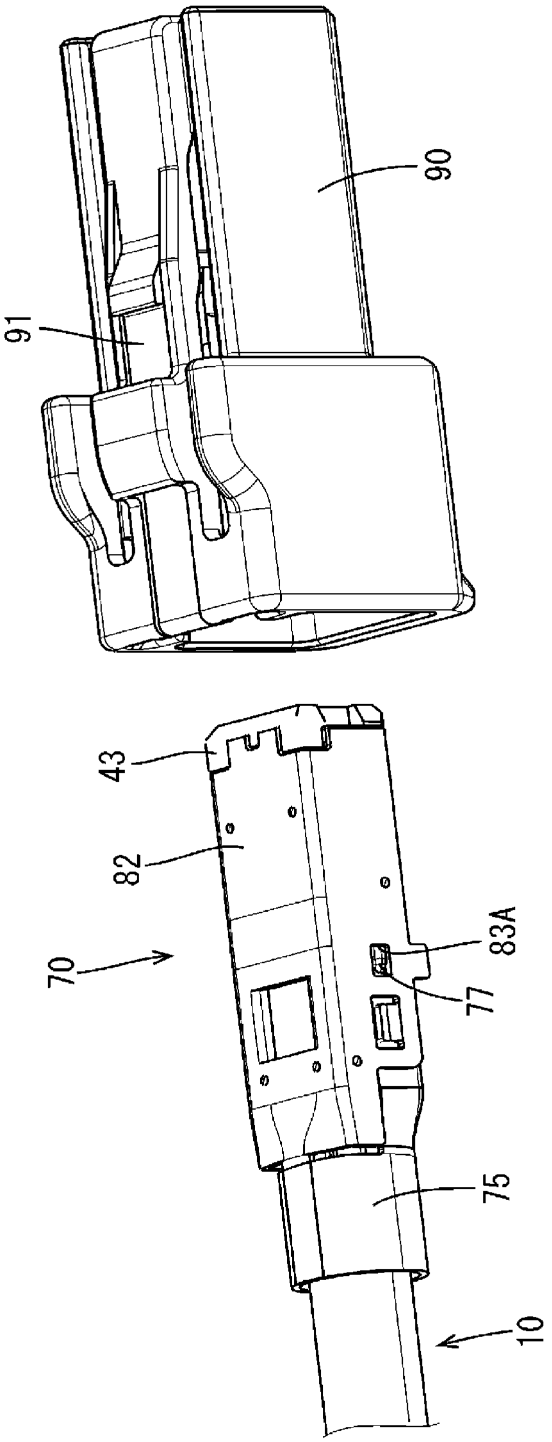
FIG. 12 is a perspective view illustrating a state prior to a housing being attached to the outer conductor of this embodiment.

As illustrated in FIG. 12, the housing 90 is made of a synthetic resin and has an overall rectangular prism-like shape that opens to both sides. On the peripheral wall of the housing 90, a lock arm 91 capable of elastically deforming in the directions toward and away from the upper wall 82 is disposed. The lock arm 91 is provided with a lock portion (not-illustrated) that projects inside the housing 90 and is capable of locking together with the outer conductor 70.

Process of Assembling the Cable 1 with a Connector

Next, an example of a process of assembling the cable 1 with a connector according to the present embodiment will be described.

First, a terminal process of the cable 10 is performed (see FIGS. 2 and 3). At the terminal portion of the cable 10, the sheath 15 is stripped at a predetermined length to expose the braided wire 14 from the sheath 15. The braided wire 14 is cut at a predetermined length to expose the coated wires 11 from the braided wire 14. Next, at the terminal portion of the coated wires 11, the insulating covers 13 are stripped at a predetermined length to expose the core wires 12 from the insulating covers 13. Then, the sleeve 16 is fitted onto the terminal portion of the sheath 15. The outer side of the sleeve 16 is covered by the braided wire 14 by the braided wire 14 exposed from the sheath 15 being folded back. This ends the terminal process of the cable 10.

Next, the inner conductors 30 are attached to the cable 10 (see FIG. 3). By compression-bonding the wire barrels 32 to the core wires 12 exposed at the terminal portions of the coated wires 11, the inner conductors 30 are connected to the terminal portions of the coated wires 11. This completes the process of attaching the inner conductors 30.

Next, the dielectric 40 is attached to the inner conductors 30 and the terminal portion of the cable 10 (see FIGS. 5, 7, 8, 9, and 11). The inner conductors 30 are housed inside the cavities 45, with the first opening ends 33A orientated to face the front wall 43. Also, the terminal portions of the insulating covers 13 adjacent to the portions of the coated wires 11 where the core wires 12 are exposed are housed inside the first electrical wire holding grooves 62A. Next, the upper cover 51A is attached to the dielectric body 41 from above, and the lower cover 51B is attached to the dielectric body 41 from below. The lock projections 49 enter inside the lock holes 53A of the lock pieces 53 and engage with the hole edges of the lock holes 53A, fixing the upper cover 51A and the lower cover 51B to the dielectric body 41. This completes the process of attaching the dielectric 40.

As illustrated in FIGS. 8 and 9, in a state with the dielectric 40 attached, the inner conductors 30 are housed inside the cavities 45, orientated so that the bottom walls 34 face the inter-row partition wall 46, one of the two first side walls 35A and 35B faces the inter-layer partition wall 47, and the other of the two first side walls 35A and 35B faces the second side wall 44. By the holding projection 48 locking into the back end of the first overlapping piece 37A, the inner conductor 30 is able to be prevented from falling out from the cavity 45. As illustrated in FIG. 7, the thin portion 47B is disposed away from the opening ends 33A and 33B, with the thin portion 47B overall being disposed adjacent to one of the first side walls 35A and 35B. In other words, the thin portion 47B is disposed at a different position to the opening ends 33A and 33B, with the thin portion 47B overall being disposed adjacent to the barrel wall of the connection barrel portion 33. The thin portion 47B is also disposed at a different position to the portion of the connection barrel portion 33 where the two overlapping pieces 37A and 37B are disposed. Also, as illustrated in FIG. 9, the through hole 46A is disposed away from the opening ends 33A and 33B, with the through hole 46A overall being disposed adjacent to the bottom wall 34. In other words, the through hole 46A is disposed at a different position to the opening ends 33A and 33B, with the through hole 46A overall being disposed adjacent to the barrel wall of the connection barrel portion 33. The through hole 46A is also disposed adjacent to the portion of the inner conductor 30 where the contact point portion 38C is disposed.

Also, as illustrated in FIG. 11, the terminal portions of the insulating covers 13 are held by an electrical wire holding portion 61 constituted by the first electrical wire holding portions 61A and the second electrical wire holding portions 61B of the upper cover 51A and the lower cover 51B. Specifically, the electrical wire holding portion 61 includes electrical wire holding holes 62 defined by the inner circumferential surfaces of the first electrical wire holding grooves 62A and the inner circumferential surfaces of the opposing second electrical wire holding grooves 62B. The electrical wire holding holes 62 have an inner diameter roughly equal to the outer diameter of the insulating covers 13. Also, the terminal portions of the insulating covers 13 are snuggly housed inside the electrical wire holding holes 62. At the terminal portion of the cable 10, the terminal portions of the coated wires 11 are exposed from the sheath 15 in an untwisted state. At this portion, the distance between the plurality of coated wires 11 tends to change, which may disturb the characteristic impedance and cause a reduction in communication quality. However, in the present embodiment, the terminal portions of the insulating covers 13 are held by the electrical wire holding portion 61, thus suppressing a disturbance in the characteristic impedance. Also, the orientation of the coated wires 11 can be controlled without providing an insulation barrel compression-bonded on the terminal portions of the insulating covers 13 in the inner conductor 30, allowing the size of the inner conductors 30 to be reduced.

Also, the four cavities 45, the inter-row partition wall 46, the inter-layer partition wall 47, and the inner conductors 30 housed inside the cavities 45 are surrounded on four side by the pair of second side walls 44 and the pair of cover bodies 52. This prevents foreign objects from entering inside the dielectric 40. In particular, in the present embodiment, though the inter-layer partition wall 47 includes the recess portions 47A and the inter-row partition wall 46 includes the through hole 46A, because the inter-layer partition wall 47 and the inter-row partition wall 46 are covered by the upper cover 51A and the lower cover 51B, foreign objects are prevented from entering inside the recess portions 47A and the through hole 46A.

Next, the outer conductor 70 is attached to the dielectric 40 (see FIGS. 11 and 12). First, the first outer conductor 71 is attached to the dielectric 40 from below. The lock projections 49 enter inside the lock holes 74A of the lock pieces 74 and engage with the hole edges of the lock holes 74A, fixing the first outer conductor 71 to the dielectric body 41. Next, the second outer conductor 81 is attached to the dielectric 40 and the first outer conductor 71 attached to the dielectric 40 from above. The bulging portions 77 enter inside the receiving holes 83A and engage with the hole edges of the receiving hole 83A, fixing the second outer conductor 81 to the first outer conductor 71. In this state, the tongue piece 84 overlaps the terminal portion of the braided wire 14 folded back to overlap the terminal of the sheath 15. Next, the fixing barrel 75 is compression-bonded to wrap around the terminal portion of the folded back braided wire 14 and the tongue piece 84. This completes the process of attached in the outer conductor 70. The outer conductor 70, when combined with the first outer conductor 71 and the second outer conductor 81, has an overall barrel-like shape and encloses the terminal portion of the cable 10 and the dielectric 40.

Next the housing 90 is attached to the outer conductor 70 (see FIGS. 1 and 12). The outer conductor 70 is inserted inside the housing 90. When the outer conductor 70 is housed at a regular housed position inside the housing 90, a lance (not illustrated) locks together with the outer conductor 70, holding the outer conductor 70 inside the housing 90. This completes the process of assembling the cable 1 with a connector.

Attaching Cable 1 with a Connector to Mating Connector

As illustrated in FIG. 9, when the cable 1 with a connector is attached to a mating connector, the tab portion T of the male terminal provided on the mating connector enters inside the connection barrel portion 33. The inner conductor 30 is electrically connected to the mating terminal by the tab portion T being sandwiched between the contact point portion 38C and the pressure receiving portion 34A.

Detaching the Inner Conductor 30

When the inner conductor 30 is detached from the dielectric 40 for maintenance or the like, first, the upper cover 51A and the lower cover 51B are detached from the dielectric body 41. Next, a tool is inserted inside the recess portions 47A to remove the inner conductors 30 from the cavities 45.

Advantageous Effects

The cable 1 with a connector of the present embodiment as described above is provided with the cable 10 including the core wires 12, the coated wires 11 including insulating covers 13 that cover the outer circumference of the core wires 12, and the braided wire 14 that encloses the outer circumference of the coated wires 11 and the connector 20 that connects to the terminal portion of the cable 10. The connector 20 is provided with the inner conductors 30 with electrical conductivity including the wire barrels 32 that connect to the core wires 12 and the terminal connection portions 31 that electrically connect to the tab portions T of the mating terminal, the dielectric 40 that is made of a synthetic resin and that includes the cavities 45 that house the inner conductors 30, and the outer conductor 70 with electrical conductivity that encloses the dielectric 40. The dielectric 40 is provided with the inter-layer partition wall 47 adjacent to the inner conductors 30, with a portion of the inter-layer partition wall 47 corresponding to the thin portion 47B with less thickness than the other portions.

According to this configuration, compared to a configuration in which the inter-layer partition wall 47 does not include the thin portion 47B, the amount of the synthetic resin forming the inter-layer partition wall 47 is less than in other portions, this amount allowing a gap to exist around the inner conductor 30. Because air has a lower dielectric constant than the synthetic resin, by reducing the amount of synthetic resin around the inner conductor 30 and forming a gap, a decrease in the characteristic impedance can be suppressed. Also, the gap formed by providing a thin portion 47B can be used as space for inserting a detachment tool for detaching the inner conductor 30 from the dielectric 40.

Also, the terminal connection portion 31 is provided with the connection barrel portion 33 including the opening ends 33A and 33B with an opening portion, the connection barrel portion 31 internally receiving the tab portion T of the mating terminal. Also, the thin portion 47B may be disposed adjacent to a portion of the connection barrel portion 33 other than the opening ends 33A and 33B.

According to this configuration, the thin portion 47B is disposed adjacent to the connection barrel portion 33 with a greater amount of metal than the other portions of the terminal connection portion 31. This allows a reduction in characteristic impedance to be effectively suppressed. Also, by the thin portion 47B being disposed away from the opening ends 33A and 33B where, in the connection barrel portion 33, a decrease in insulation withstand voltage tends to occur, the insulation withstand voltage can be ensured.

Also, the dielectric 40 is provided with the inter-row partition wall 46 adjacent to the inner conductor 30, with the inter-row partition wall 46 including the through hole 46A.

According to this configuration, compared to a configuration in which the inter-row partition wall 46 does not include the through hole 46A, the amount of the synthetic resin forming the inter-row partition wall 46 is less than in other portions, this amount allowing space to exist around the inner conductor 30. Because air has a lower dielectric constant than the synthetic resin, by reducing the amount of synthetic resin around the inner conductor 30 and forming space, a decrease in the characteristic impedance can be suppressed.

Also, the terminal connection portion 31 is provided with the connection barrel portion 33 including the opening ends 33A and 33B with an opening portion, the connection barrel portion 31 internally receiving the mating terminal. Also, the through hole 46A may be disposed adjacent to a portion of the connection barrel portion 33 other than the opening ends 33A and 33B.

According to this configuration, the through hole 46A is disposed adjacent to the connection barrel portion 33 with a greater amount of metal than the other portions of the terminal connection portion 31. This allows a reduction in characteristic impedance to be effectively suppressed. Also, by the through hole 46A being disposed away from the opening ends 33A and 33B where, in the connection barrel portion 33, a decrease in insulation withstand voltage tends to occur, the insulation withstand voltage can be ensured.

Also, the terminal connection portion 31 is provided with the contact point portion 38C that comes into contact with the mating terminal. The through hole 46A is disposed adjacent to a portion of the terminal connection portion 31 where the contact point portion 38C is disposed.

The portion of the terminal connection portion 31 where the contact point portion 38C is disposed tends to have a particularly large amount of metal compared to other portions. By the through hole 46A being disposed adjacent to this portion, a reduction in characteristic impedance can be effectively suppressed.

Also, the dielectric 40 includes a holding projection 48 that holds the inner conductor 30 inside the cavity 45 by projecting inside the cavity 45 and fixing the inner conductor 30 in place. The holding projection 48 and the through hole 46A are disposed aligned in a direction orthogonal to the inter-row partition wall 46.

According to this configuration, the through hole 46A can be advantageously used as a hole for forming the holding projection 48 when forming the dielectric 40.

Also, the dielectric 40 is provided with the dielectric body 41 including the inter-layer partition wall 47 and the inter-row partition wall 46 and the lower cover 51B and the upper cover 51A that are attached to the dielectric body 41 and cover the inter-layer partition wall 47 and the inter-row partition wall 46. According to this configuration, a foreign object entering inside the space formed due to the thin portion 47B or the through hole 46A can be prevented.

OTHER EMBODIMENTS

1. In the embodiment described above, the cable 10 is provided with four coated wires 11, but the number of coated wires provided in the cable is discretionary.

2. In the embodiment described above, in the dielectric 40, the four cavities 45 are arranged in an upper and a lower level with two cavities 45 in each. However, the total number of cavities in the dielectric, the number of levels, and the number of cavities in one level are discretionary.

3. In the embodiment described above, the inter-layer partition wall 47 includes the thin portion 47B and the inter-row partition wall 46 includes the through hole 46A. However, in the dielectric, which wall portion the thin portion and the through hole are provided on is discretionary. For example, the inter-layer partition wall may include the through hole and the inter-row partition wall may include the thin portion. Also, one wall portion may include both the thin portion and the through hole.

4. In the embodiment described above, the thin portion 47B is disposed adjacent to the wall surface of the first side walls 35A and 35B. However, the thin portion may be disposed adjacent to any wall portion forming the peripheral wall of the connection barrel portion and may be disposed adjacent to the bottom wall or adjacent to the top wall, for example.

5. In the embodiment described above, the through hole 46A is disposed adjacent to the wall surface of the bottom wall 34. However, the through hole may be disposed adjacent to any wall portion forming the peripheral wall of the connection barrel portion and may be disposed adjacent to the first side wall or adjacent to the top wall, for example.

6. In the embodiment described above, the electrical wire holding portion 61 includes the electrical wire holding holes 62 and the electrical wire holding holes 62 are holes defined by the inner circumferential surfaces of the first electrical wire holding grooves 62A and the opposing second electrical wire holding grooves 62B. However, the configuration of the electrical wire holding portion is not limited to the embodiment described above, and the dielectric body may include an electrical wire holding groove that houses the entire terminal portion of the insulating cover, for example.

7. In the embodiment described above, the dielectric 40 includes the dielectric body 41 including the inter-layer partition wall 47 and the inter-row partition wall 46 and the lower cover 51B and the upper cover 51A that are attached to the dielectric body 41 and cover the inter-layer partition wall 47 and the inter-row partition wall 46. However, the cover may cover only one of the first wall portion and the second wall portion.

LIST OF REFERENCE NUMERALS

1 Cable with a connector
10 Cable
11 Coated wire
12 Core wire
13 Insulating cover
14 Braided wire (shield member)
15 Sheath
16 Sleeve
20 Connector
30 Inner conductor
31 Terminal connection portion
32 Wire barrel (electrical wire connection portion)
33 Connection barrel portion
33A First opening end (opening end)
33B Second opening end (opening end)
34 Bottom wall
34A Pressure receiving portion
35A, 35B First side wall
36 Top wall
37A First overlapping piece
37B Second overlapping piece
38 Flexible contact piece
38A Base end portion
38B Free end portion
38C Contact point portion
40 Dielectric
41 Dielectric body
42 Inner conductor holding portion
43 Front wall
43A Tab insertion hole
44 Second side wall
45 Cavity
45L1 First cavity row
45L2 Second cavity row
46 Inter-row partition wall (second wall portion)
46A Through hole
47 Inter-layer partition wall (first wall portion)
47A Recess portion
47B Thin portion
48 Holding projection
49 Lock projection
51A Upper cover (cover)
51B Lower cover (cover)
52 Cover body
53 Lock piece
53A Lock hole
61 Electrical wire holding portion
61A First electrical wire holding portion
61B Second electrical wire holding portion
62 Electrical wire holding hole
62A First electrical wire holding groove
62B Second electrical wire holding groove
70 Outer conductor
71 First outer conductor
72 Lower wall
73 Third side wall
74 Lock piece
74A Lock hole
75 Fixing barrel
76 Slit
77 Bulging portion
81 Second outer conductor
82 Upper wall
83 Fourth side wall
83A Receiving hole
84 Tongue piece
90 Housing
91 Lock arm
T Tab portion (mating terminal)

What is claimed is:

1. A connector that connects to a terminal portion of a cable provided with a coated wire including a core wire and an insulating cover that covers an outer circumference of the core wire, and a shield member that encloses an outer circumference of the coated wire, the connector comprising:

an inner conductor with electrical conductivity including an electrical wire connection portion that connects to the core wire and a terminal connection portion including a flexible contact piece that electrically connects to a mating terminal;

a dielectric that is made of a synthetic resin and that includes a cavity that houses the inner conductor; and an outer conductor with electrical conductivity that encloses the dielectric, wherein the dielectric includes a first wall portion adjacent to the inner conductor, a portion of the first wall portion is a thin portion with less thickness than other portions, and the thin portion is disposed adjacent to a portion of the terminal connection portion of the inner conductor where the flexible contact piece is disposed.

2. The connector according to claim 1, wherein the terminal connection portion includes a connection barrel portion including an opening end with an opening portion, the connection barrel portion internally receiving the mating terminal, and the thin portion is disposed adjacent to a portion of the connection barrel portion other than the opening end.

3. The connector according to claim 1, wherein the dielectric includes a second wall portion adjacent to the inner conductor, and the second wall portion includes a through hole.

4. The connector according to claim 3, wherein the terminal connection portion includes a connection barrel portion including an opening end with an opening portion, the connection barrel portion internally receiving the mating terminal, and the through hole is disposed adjacent to a portion of the connection barrel portion other than the opening end.

5. The connector according to claim 3, wherein the flexible contact piece of the terminal connection portion includes a contact point portion that comes into contact with the mating terminal, and the through hole is disposed adjacent to a portion of the terminal connection portion where the contact point portion is disposed.

6. The connector according to claim 3, wherein the dielectric includes a holding projection that holds the inner conductor inside the cavity by projecting inside the cavity and fixing the inner conductor in place, and the holding projection and the through hole are disposed aligned in a direction orthogonal to the second wall portion.

7. The connector according to claim 3, wherein the dielectric includes a dielectric body including the second wall portion and a cover that attaches to the dielectric body and covers the second wall portion.

8. The connector according to claim 1, wherein the dielectric includes a dielectric body including the first wall portion and a cover that attaches to the dielectric body and covers the first wall portion.

9. The connector according to claim 1, wherein the terminal connection portion includes a connection barrel portion including a bottom wall, a pair of side walls, and a top wall, two overlapping pieces extending contiguously from one of the side walls toward the other of the side walls are disposed adjacent to opposite opening ends of the connection barrel portion, respectively, on an outer surface of the top wall, and the thin portion is disposed between the two overlapping pieces in a plan view.

10. A cable with a connector comprising:

a cable including a coated wire including a core wire and an insulating cover that covers an outer circumference of the core wire, and a shield member that encloses an outer circumference of the coated wire; and a connector that connects to a terminal portion of the cable, wherein the connector includes:

an inner conductor with electrical conductivity including an electrical wire connection portion that connects to the core wire and a terminal connection portion including a flexible contact piece that electrically connects to a mating terminal;

a dielectric that is made of a synthetic resin and that includes a cavity that houses the inner conductor; and an outer conductor with electrical conductivity that encloses the dielectric, the dielectric includes a first wall portion adjacent to the inner conductor, a portion of the first wall portion is a thin portion with less thickness than other portions, and the thin portion is disposed adjacent to a portion of the terminal connection portion of the inner conductor where the flexible contact piece is disposed.

* * * * *